United States Patent [19]

Jaffe

[11] 4,056,664
[45] Nov. 1, 1977

[54] ELECTROCHEMICAL CELL HAVING AN AGO ELECTRODE DISCHARGING AT AN AG₂O VOLTAGE LEVEL

[75] Inventor: Sol Samson Jaffe, West Orange, N.J.

[73] Assignee: P. R. Mallory & Co. Inc., Indianapolis, Ind.

[21] Appl. No.: 763,375

[22] Filed: Jan. 28, 1977

[51] Int. Cl.² ........................................... H01M 10/34
[52] U.S. Cl. .................................. 429/217; 429/219; 429/229; 429/230
[58] Field of Search ............... 429/219, 229, 230, 222, 429/217, 206

[56] References Cited

U.S. PATENT DOCUMENTS

| | | | |
|---|---|---|---|
| 3,655,450 | 4/1972 | Soto-Krebs | 429/219 X |
| 3,935,026 | 1/1976 | Howard | 429/219 X |
| 3,990,916 | 11/1976 | Sugimoto et al. | 429/219 X |

*Primary Examiner*—Anthony Skapars
*Attorney, Agent, or Firm*—Ronald S. Cornell; Israel Nissenbaum; Charles W. Hoffmann

[57] ABSTRACT

The voltage level of an electrochemical cell having a divalent silver oxide (AgO) cathode is reduced to and maintained at the monovalent silver oxide (Ag$_2$O) level by an attenuated divalent silver oxide layer between the divalent silver oxide cathode and the cathode current collector.

10 Claims, 3 Drawing Figures

ELECTROCHEMICAL CELL HAVING AN AGO ELECTRODE DISCHARGING AT AN AG₂O VOLTAGE LEVEL

This invention relates to electrochemical cells having divalent silver oxide cathodes and more particularly to alkaline zinc-silver oxide cells.

Silver oxide cells have been made in the past for low-rate continuous drain applications such as in hearing aids, cameras, digital watches and the like. The silver oxide used in such cells is conventionally of the monovalent ($Ag_2O$) type because of its level discharge voltage (of about 1.5 volts) making it compatible with prior manganese dioxide/zinc alkaline cells but with improved capacity. Recently, commercial silver oxide cells have been made utilizing divalent silver oxide (with a theoretical capacity of 432 mAH/gm as compared with the 231 mAH/gm of the monovalent silver oxide). With the densities of both silver oxides approximately the same the theoretical volumetric energy density for the divalent silver oxide cathode is about twice that of the monovalent silver oxide cathode. Since the application of silver oxide cells is usually for confined areas of small dimensions, small button cells are the most common form of silver oxide cell. Accordingly, the increase in capacity without a concomitant increase in volume is an important achievement. However, divalent silver oxide has some severe drawbacks making it unsuitable for use in devices such as the aforementioned hearing aids, watches and cameras without some remedial measures. Among these drawbacks is the voltage drop accompanying the reduction of divalent to monovalent silver oxide during low rate discharge of the cell. In conjunction with a zinc anode divalent silver oxide has a voltage of about 1.7-1.8 volts and the monovalent silver oxide discharges at a voltage of about 1.56-1.58 volts. Accordingly, during the discharge of the cell there is a detrimental voltage drop after the cell has delivered a significant portion of its output (resulting from the discharge of the divalent oxide followed by the discharge of the formed monovalent oxide) which devices requiring a stable voltage cannot tolerate. As a result, remedial measures have been employed in an effort to suppress the normally high voltage of the divalent silver oxide to the lower level of the monovalent silver oxide at the outset of cell operation or within a short period of time afterwards.

Remedial measures have included the isolation of the divalent silver oxide from the cathode current collector such as by the interposition of a layer of monovalent silver oxide. Accordingly, the cell operates at the lower voltage because it is the monovalent silver oxide which receives the electron flow during discharge and not the divalent layer. The monovalent silver oxide is accordingly reduced to elemental silver. As the cell reaction progresses, the formed elemental silver is reoxidized by the divalent silver oxide to further replenish the monovalent silver oxide and the voltage is thereby maintained until exhaustion of the cell. The interposition of the monovalent silver oxide layer has been effected in several ways in the prior art and specifically by either the physical emplacement of the monovalent silver oxide during the construction of the cell or by growing a monovalent silver oxide layer in situ by coating the inner surface of the cathode collector with silver such that the silver is quickly oxidized to the monovalent silver oxide by the divalent silver oxide. The latter procedure may involve a delay on discharge before the voltage drops to the monovalent silver oxide level but the delay is short as compared to the time necessary for the divalent silver oxide for form its own similar monovalent product as a result of cell reaction. Another voltage suppression means involves the introduction within the cell and between the cathode of the divalent silver oxide and the cathode current collector of an oxidizable metal layer, screen, or ring such as zinc with the divalent silver oxide adjacent to the current collector being reduced to the monovalent oxide while oxidizing the metal of the layer, screen, or ring to its corresponding oxide.

Thus, the above suppression methods require either the physical introduction of the monovalent silver oxide as a separator between the divalent silver oxide and the current collector; or an in situ reaction between the divalent silver oxide and a metal. Reaction of the divalent silver oxide with a metal reduces the quantity of the divalent silver oxide, which reduces capacity of the cathode active material. The introduction, into direct contact with the cathodes, of foreign elements such as zinc which are capable of gassing if the in situ reaction is incomplete is also undesirable.

It is an object of the present invention to provide a cell having as cathode only divalent silver oxide, without any additional reactive material in contact therewith, but wherein the cathode discharges at the suppressed, monovalent silver oxide voltage.

This and other objectives will be apparent from the following discussion as well as from the drawings in which.

Figure 1:
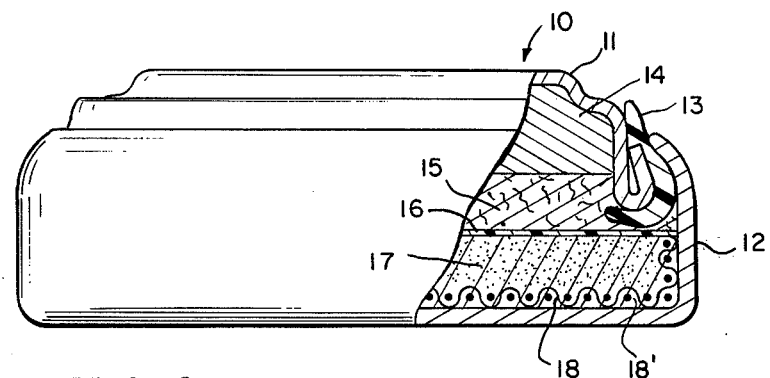
FIG. 1 is a partially sectioned elevation view of an electrochemical cell embodying the present invention.

It has been discovered that, by attenuating some of the divalent silver oxide and positioning the attenuated oxide as a continuous layer (i.e. a layer of divalent silver oxide and attenuating means) between the mass of divalent silver oxide cathode and the cathode current collector, a relatively rapid drop in voltage from the divalent to the monovalent level is caused to take place when the cell is put on discharge. This drop is achieved without the introduction of monovalent silver oxide in the construction of the cell and without the necessity of any reaction other than the normal cell discharge reaction.

The attenuated divalent silver oxide layer is so formed and located as to prevent direct contact between the unattenuated silver oxide and the cathode current collector. To effect this electrical isolation of the divalent silver oxide cathode the attenuation of the divalent silver oxide layer is in a direction parallel to the contacting surfaces between the divalent silver oxide cathode and the cathode current collector, with only relatively small points of contact thereby existing between the cathode and the cathode current collector. Although the attenuated layer increases the internal resistance of the cell somewhat as a result of the attenuation, the effect of such increase is relatively small or negligible at the low rate of discharge at which this cell normally operates. Additionally, it is not necessary that the attenuated layer completely surround the divalent silver oxide cathode as long as the cathode is electrically isolated by an insulator from the current collector at those areas where the attenuated layer is not present.

Attenuation of the divalent silver oxide is preferably accomplished by compressing a quantity of the divalent silver oxide onto a non-conductive, non-reactive screen, with a portion of the divalent silver oxide filling the open spaces in the screen. The screen isolates portions of the oxide from other portions thereof while permitting transverse abutment of the oxide particles such that there are complete electrical paths between the main body of the cathode and the current collector. Since the paths are generally isolated from one another they provide an attenuated connection. It is this attenuated connection which allows the divalent silver oxide to discharge at the monovalent voltage level after only a short period of discharge, or immediately if the cell is momentarily shorted. As a result of the requirement that the screen be nonconductive it cannot be metallic. Suitable materials for the screen include most plastics such as polyesters, polypropylene, polyethylene, nylon and polytetrafluoroethylene all of which are non-conductive, stable in an alkaline cell environment, and non-reactive with the highly oxidizing divalent silver oxide. The above materials are additionally preferred because of their commercial availability.

A further means for obtaining an attenuated divalent silver oxide layer is by compressing a mixture of non-conductive material (such as one of the abovementioned plastics) in powder form and a small amount of particulate divalent silver oxide. The compression can be effected either in the cell container or externally thereof to form discrete pellets.

When using a non-conductive screen the degree of attenuation can be controlled by varying the size of the openings in the screen or the distance between openings. A degree of control of the attenuation in the pressed powder embodiment can be obtained in varying the proportions of the divalent silver oxide and the non-conductive material mixed therewith.

With respect to the non-conductive screen, extremes in either the size of the opening or the distance between openings can be detrimental to the operation of the present invention. Thus, the use of a very small opening size or a large distance between openings may result in a high internal resistance which could render the cell impractical for any meaningful discharge purpose. The use of excessively large openings or very small distances between openings may result in a condition approximating that of direct electrical contact between the divalent silver oxide and the cathode current collector thereby causing an undesirable voltage step during cell discharge.

There are generally three dimensional parameters with respect to the non-conductive screen which will affect cell operation. These are (a) mesh count (openings/inch), (b) mesh opening (microns or inches), and (c) thread diameter (microns or inches). As these parameters are varied the percent of open-area changes. Since it is the open area which accommodates the divalent silver oxide, the degree of attenuation is directly related thereto. The percentage of open area and hence the percentage of divalent silver oxide by volume in the attenuated layer should range between 20 and 50 percent. Preferably, the open area will be about 25 to 40 percent and in the most preferred embodiment the open area is about 31%.

The compressed divalent silver oxide within the open areas should additionally have sufficient cohesiveness resulting from the compression to have sufficient structural integrity to provide adequate electrical conduction in the cell. A pressure of at least 13 tons/in$^2$ is sufficient to provide such integrity in the construction of the attenuated divalent silver oxide layer.

When the attenuated divalent silver oxide layer is composed of a mixture of a powdered non-conductive material with the silver oxide it is the volumetric ratio of the divalent silver oxide to the inert non-conductive attenuating material which is determinative of the degree of attenuation. Accordingly, a volumetric ratio of divalent silver oxide to inert non-conductive attenuating material in the attenuated layer or in the discrete attenuated pellet should range from 1:4 to 1:1 with a preferred ratio of about 1:2.

Since the non-conductive, non-reactive material in the attenuated divalent silver oxide layer occupies a portion of normally usable space the thickness of the attenuated layer should not be greater than about 25% of the normally usable diameter of the cathode or about 75% of the normally usable height thereof. A greater thickness would negate the effect of using the higher capacity divalent silver oxide in place of the more stable monovalent silver oxide.

Referring now to FIG. 1 of the drawings a button cell 10 is shown as having a metallic anode 14. Zinc, and particularly amalgamated zinc, is the preferred anodic material with cadmium also being a highly desirable anode material. Other useful anodic materials include magnesium, calcium, aluminum and manganese. A cathode of divalent silver oxide 17 is separated from the anode 14 by a porous separator 16 and an absorbent spacer 15 with the latter having contained therein an alkaline electrolyte such as potassium hydroxide (KOH) or sodium hydroxide (NaOH) for ionic conductivity. Cell top 11 is in direct contact with the anodic material and functions as the anode current collector and negative terminal of the cell. Container 12, which is electrically insulated from cell top 11 by a plastic snap-on grommet 13, made from an insulative material such as nylon or polyolefins such as polyethylene or polypropylene, functions both as the cathode current collector and the positive terminal of the cell. Both cell top 11 and container 12 may be composed of conductive metals such as stainless steel, nickel of nickel plated steel with the inner surfaces of cell top 11 coated with a suitable metal such as tin, copper, silver or gold. Cathode 17 is isolated from direct contact with current collector 12 by a layer of cathode material which is attenuated by a non-conductive plastic screen 18. Accordingly, electrical contact between cathode 17 and cathode current collector 12 is effectuated in attenuated form through divalent silver oxide particles contained within the openings in screen 18 with the screen and divalent silver oxide therein forming attenuated layer 18'.

Figure 2:
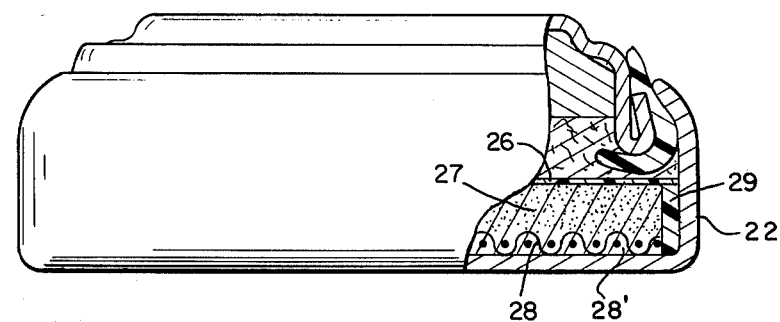
FIG. 2 is a partially sectioned view of a second embodiment of a cell made in accordance with the invention.

FIG. 2 shows a divalent silver oxide cathode 27 separated from cathode current collector container 22 by a non-conductive ring 29 made from a material such as polyolefins which include polyethylene and polypropylene and a disc shaped, non-conductive plastic screen 28. The cathode 27 is electronically insulated from other cell components by separator 26. Electrical contact between the cathode 27 and cathode current collector 22 is effectuated in attenuated form only through plastic screen 28 having contained therein a quantity of divalent silver oxide. The screen with contained divalent silver oxide constitutes attenuated layer 28'.

Figure 3:
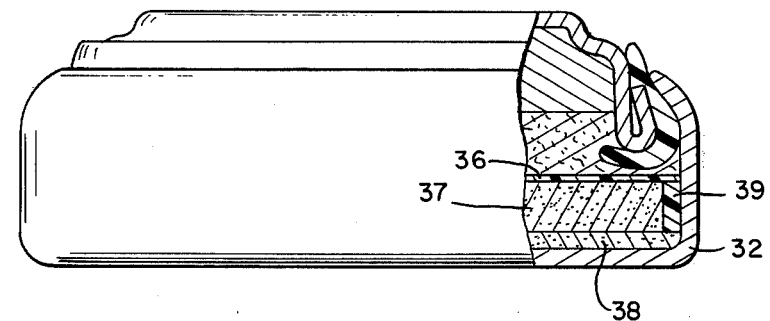
FIG. 3 is a partially sectioned view of yet a third embodiment of a cell made in accordance with this invention.

In place of the non-conductive plastic screen shown in FIGS. 1 and 2 it is possible to use either a discrete disc or a cup formed from a mixture of particulate, divalent silver oxide and non-conductive attenuating material. The disc or cup can either be placed in the cell container as a preformed element or the powdered mixture can be compressed in situ to form the desired attenuated divalent silver oxide layer. FIG. 3 shows a construction using a divalent silver oxide cathode 37 which is isolated from cathode can 32 by a disc 38 of this type and a plastic ring 39. A porous separator 36 electronically insulates the cathode 37 from the other cell components.

The cathodes 17, 27 & 37 of FIGS. 1-3 should preferably contain a small non-attenuating amount of a material such as polytetrafluoroethylene as a lubricant for molding.

The following examples are given to illustrate the construction and efficacy of the present invention. In the examples as well as throughout the specification and claims all parts and percentages are by weight unless otherwise indicated.

EXAMPLE I

A button cell with a diameter of 0.45 inch, a height of 0.205 inch a volume of 0.03 cubic inch is made by placing a monofilament polypropylene screen cup as shown in FIG. 1 having an open area of 31% and a thread diameter 0.004 inch in a nickel container. A cathode of divalent silver oxide with 0.5% by weight of polytetrafluoroethylene as lubricant and weighing 0.79 grams is pressed into the polypropylene screen cup with a pressure of 44 tons/in². An anode which is 90% by weight zinc and 10% by weight mercury and which weighs 0.41 grams is pressed into the cell top. An absorbent spacer formed of matted polypropylene, a porous separator which is a film of cellophane contained between two films of irradiated polyethylene and a nylon grommet are placed between the cell container and the top. Electrolyte is then added and the container is then crimped around the grommet to seal the cell. The electrolyte is 171 milligrams of 30% NaOH with 5% ZnO.

The cell, when discharged under a 6.5 kΩ load, shows a voltage drop from 1.8 volts to 1.55 volts after 5 minutes.

In comparison, a cell similarly constructed but without the polypropylene screen cup, when discharged under the same 6.5 kΩ load, maintains a voltage at 1.8 volts for about 100 hours before dropping to the lower 1.55 voltage.

EXAMPLE II

A cell constructed as in EXAMPLE I is discharged under a 94 kΩ load. The voltage drops to 1.58 volts within 10 hours.

In comparison, a cell constructed and discharged similarly but without the screen cup remained at 1.84 volts for 13 days at which time it was removed from the load.

The theoretical output of each of the cells made and tested in accordance with Examples I and II is 303 mAH, with the cells being anode limited. The theoretical capacity of the cathode is about 340 mAH. After full discharge of the cell an output of 284 mAH is realized which represents an ampere hour yield of about 94% of the theoretical capacity of 303 mAH.

By way of comparison it should be noted that prior art monovalent silver oxide cells having basically the same size and construction have been rated at 180 mAH capacity.

The preceeding Examples are for illustrative purposes only. It is understood that changes and variations can be made without departing from the spirit and scope of the present invention as defined in the following claims.

What is claimed is:

1. An electrochemical cell comprising an anode, a cathode, a cathode current collector, and an electrolyte wherein said cathode comprises divalent silver oxide, a portion of said divalent silver oxide is attenuated in a direction parallel to the adjacent surfaces of said cathode and said cathode current collector, and the portion of said divalent silver oxide which is attenuated is positioned adjacent the surface of said cathode current collector whereby an increase in internal cell resistance is introduced, and wherein the amount of divalent silver oxide in the attenuated layer is 20 to 50 percent by volume and the balance is a non-conductive, non-reactive material.

2. The cell of claim 1 wherein said non-conductive, non-reactive material comprises a plastic screen.

3. The cell of claim 2 wherein said plastic screen is cup-shaped.

4. The cell of claim 2 wherein said plastic screen is disc-shaped.

5. The cell of claim 2 wherein said plastic is polypropylene.

6. The cell of claim 2 wherein said screen has an open area of from 25 to 40 percent.

7. The cell of claim 6 wherein said screen has an open area of about 31 percent.

8. The cell of claim 1 wherein said portion of divalent silver oxide is admixed with said non-conductive, non-reactive material in powder form whereby said mixture is thereby formed into a discrete body.

9. The cell of claim 6 wherein said material is polypropylene.

10. The cell of claim 1 wherein said anode is selected from the group consisting of zinc and amalgamated zinc and said electrolyte is alkaline.

* * * * *